June 18, 1968 NOBUTOSHI KIHARA 3,389,217
MAGNETIC TAPE RECORDING AND REPRODUCING APPARATUS
Filed Dec. 28, 1964 2 Sheets-Sheet 1

INVENTOR.
NOBUTOSHI KIHARA
BY
Ward, Haselton, McElhannon, Orme, Brooks & Fitzpatrick
ATTORNEYS June 18, 1968 NOBUTOSHI KIHARA 3,389,217

MAGNETIC TAPE RECORDING AND REPRODUCING APPARATUS

Filed Dec. 28, 1964 2 Sheets-Sheet 2

INVENTOR.
NOBUTOSHI KIHARA
BY
Ward, Haselton, McElhannon, Orme, Brooks & Fitzpatrick
ATTORNEYS United States Patent Office 3,389,217
Patented June 18, 1968

3,389,217
MAGNETIC TAPE RECORDING AND REPRODUCING APPARATUS

Nobutoshi Kihara, Tokyo, Japan, assignor to Sony Corporation, Tokyo, Japan, a corporation of Japan Filed Dec. 28, 1964, Ser. No. 421,204
Claims priority, application Japan, Dec. 26, 1963, 38/12,486
9 Claims. (Cl. 178—6.6)

ABSTRACT OF THE DISCLOSURE

In a video tape recorder in which the magnetic tape is scanned obliquely to its direction of travel by a rotary magnetic head, and wherein a still picture is produced by stopping the tape movement and continuing rotation of the head to repeatedly scan the same path on the tape, excessive wear or abrasion of the tape due to repeated scanning is prevented by detecting means connected to the magentic head for detecting changes in the reproduced signal due to wear or abrasion of the tape at the portion being repeatedly scanned, and, in response to detected changes in the reproduced signal, discontinuing scanning of such portion of the tape either by stopping rotation of the head, moving the head away from the tape or activating the tape transport.

This invention relates to a magnetic tape recording and reproducing apparatus, and more particularly to a magnetic video tape recorder which is capable of producing a still picture without injury to the magnetic tape.

A conventional video tape recorder records information such as television signals on magnetic tape by scanning the magnetic tape with a rotary magnetic head obliquely to its direction of travel. In order to produce a still picture the tape is stopped while the magnetic head continues to repeatedly scan the same path on the magnetic tape. In order to reduce wear or abrasion on the tape it is necessary that the still scanning be continued only for a short period of time.

In view of the foregoing it is the primary object of the present invention to provide an improved magnetic tape recording and reproducing apparatus.

Another object of the present invention is to provide an improved magnetic video tape recorder which is capable of producing still pictures.

A further object of the present invention is to provide a magnetic video tape recorder which is capable of producing still pictures without wear or abrasion of the tape.

These and further objects and features of the invention will appear from the following detailed description of several embodiments of the invention to be read in conjunction with the accompanying drawings in which like components in the several views are identified by the same reference numeral.

Briefly stated the present invention relates to apparatus for incorporation in a video tape recorder which will prevent scanning of any one portion of the magnetic tape for any excessive period of time which will result in wear or abrasion of the magnetic tape. This is accomplished by constantly monitoring the output of the magnetic tape during reproduction and as soon as a signal is generated which is indicative of wear or abrasion of the tape, apparatus is activated to either discontinue scanning or to move the rotating head such that another segment of the magnetic tape is being scanned.

Figure 1:
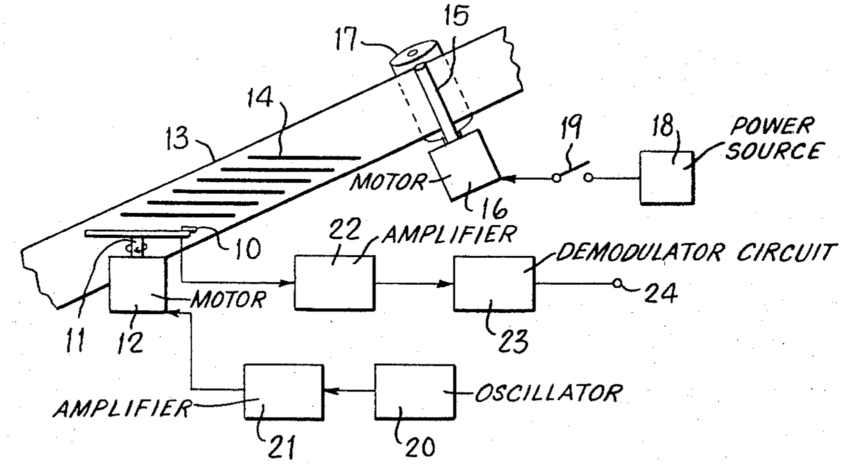
FIGURE 1 is a schematic plan view illustrating the operation of a typical video tape recorder.

Referring now to the figures and particularly to FIGURE 1 thereof, there is illustrated schematically the essential portions of a video tape recorder. As illustrated in FIGURE 1, a rotary magnetic head 10 is rotatably mounted on the shaft 11 of a motor 12 in such a manner that the head scans a magnetic tape 13 and forms magnetic tracks 14 on the tape, the tracks being oblique to the longitudinal direction of the movement of the tape. On each magnetic track 14 video signals of one field or of its multiple may be recorded.

The tape 13 is moved past the head 10 by a capstan 15 which is driven by a motor 16, the capstan 15 cooperating with the pinch roller 17 to drive the tape 13. The power source for the capstan motor is indicated by the numeral 18 and a switch 19 is interposed between the capstan motor 16 and its power source 18 for a purpose to be presently described.

The head motor 12 has connected to it an oscillator 20 and a power amplifier 21 to amplify the output of the oscillator. The head 10 has connected to it an amplifier 22 followed by a demodulator circuit 23, the output of the demodulator having connected to it a video signal output terminal 24.

With a video tape recorder such as that illustrated schematically in FIGURE 1, if the magnetic tape 13 is transported by the capstan 15 at the same speed both during recording and reproducing, the same video signals are obtained during reproducing as those that were recorded. If the tape 13 is stopped during playback by opening the power switch 19, a so-called still picture will be obtained since the head 10 will continue to rotate at the same speed as during recording.

When a still picture is produced in this manner, however, the surface of the magnetic tape is subjected to wear due to the repeated scanning of the magnetic head 10 at the same position on the magnetic tape 13. When such wear occurs a finely-divided powder formed from the magnetic tape adheres to the air gap portion of the head 10. When this occurs it is no longer possible to obtain good reproduction and the tape will be destroyed if further scanning is continued.

In order to avoid such excessive wear or abrasion of the magnetic tape, the apparatus of the present invention either (1) automatically stops the rotary magnetic head 10 from rotating, or (2) the magnetic head 10 is moved out of contact with the magnetic tape 13, or, (3) the magnetic tape 13 is shifted slightly at a predetermined time when wear of the tape exceeds its tolerance. The apparatus of the present invention is activated in order to accomplish one of these objects only after the tape has been scanned in one place for such a period of time that the wearing of the tape has exceeded the tape tolerance limit.

Figure 2:
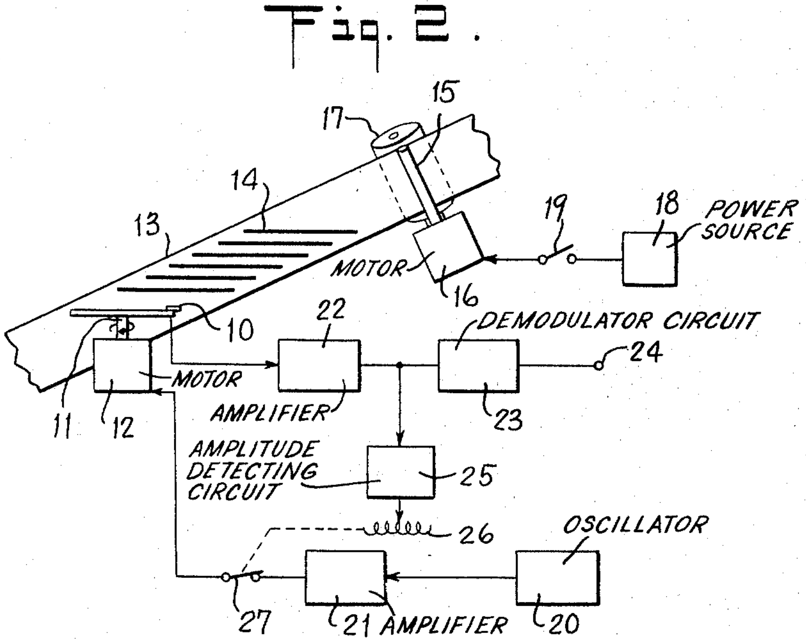
FIGURE 2 is a schematic plan view similar to FIGURE 1 but incorporating apparatus in accordance with the present invention.

In FIGURE 2 there is illustrated an embodiment of the present invention in which the rotation of the rotary magnetic head 10 is automatically stopped when the wearing of the tape has exceeded the tape tolerance limit. In the apparatus illustrated in FIGURE 2 a portion of the signal that is supplied to the demodulator 23 from the head 10 during reproducing is also supplied to an amplitude detecting circuit 25. In this manner when the magnetic tape 13 is not worn, a frequency modulating signal is obtained which has substantially a constant amplitude level $A_1$ as illustrated in FIGURE 3A. When the magnetic tape 13 has worn beyond a certain tolerance limit, the amplitude of the signal falls, as shown by the amplitude level $A_2$ in FIGURE 3A. When a signal level variation such as illustrated in FIGURE 3B is detected, a gating signal is generated which is turned on and off by the detector output as illustrated in FIGURE 3C. This gating signal is supplied from the amplitude detecting circuit 25 to a relay circuit 26. A contact 27 of the relay circuit 26 is inserted between the power amplifier 21 and the head motor 12.

It can therefore be seen that when the amplitude level of the output from the head 10 decreases as illustrated in FIGURES 3A and 3B, the relay 26 is activated by the gating signal. When the relay 26 is thus activated, the contact 27 is opened and the rotation of the head 12 is stopped, thereby stopping the scanning and any further wear on the magnetic tape.

Figure 3:
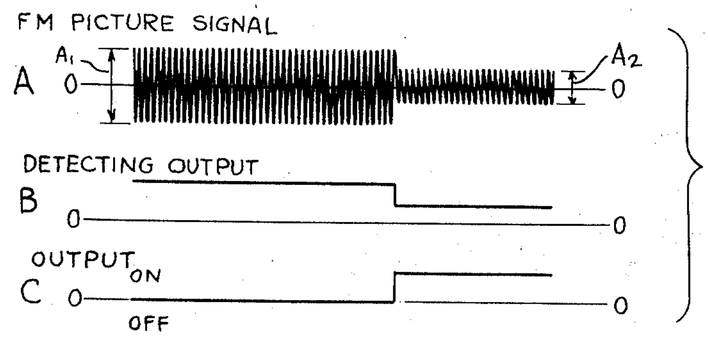
FIGURE 3 illustrates various wave forms produced by a portion of the apparatus illustrated in FIGURE 2 and which is utilized in the practice of the present invention.
Figure 4:
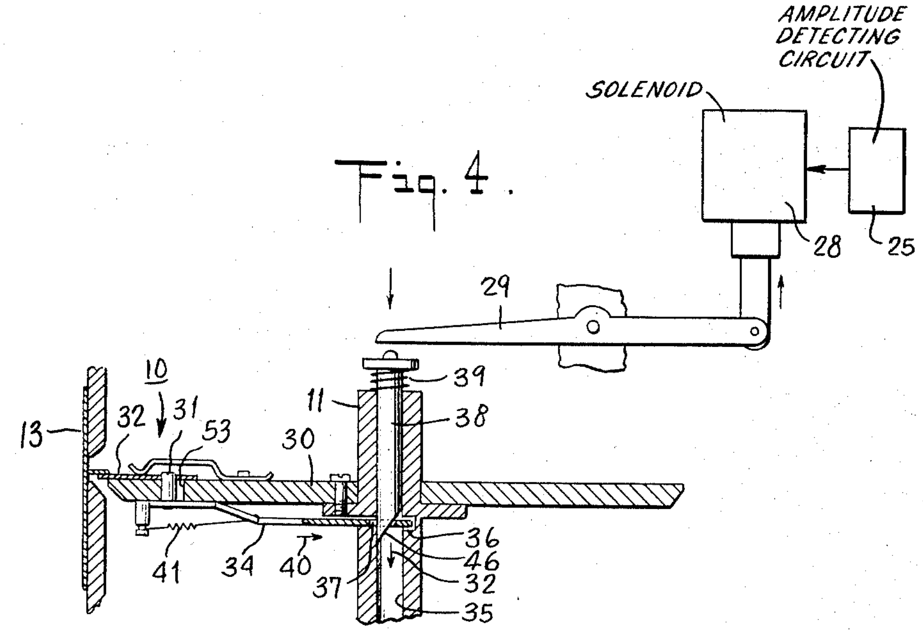
FIGURE 4 is a schematic diagram illustrating a portion of the video tape recorder of FIGURE 2 and illustrating another embodiment of the invention.

In the apparatus illustrated in FIGURE 4 when the wear of the magnetic tape exceeds a certain tolerance limit, the magnetic head is moved out of contact with the magnetic tape. In the apparatus illustrated in FIGURE 4, the output of the amplitude detecting circuit 25 is connected to a plunger or armature of a solenoid 28. Thus, when the amplitude of the signal from the head falls, such as illustrated in FIGURE 3A, the plunger is activated. The plunger of solenoid 28 has connected to it a lever 29 which is pivoted in such a manner that when the plunger 28 is activated the free end of the lever 29 moves downwardly as indicated by the arrow in FIGURE 4. The magnetic head 10 is so mounted on a head drum or disc 30, which, in turn, is rotatably mounted on the shaft 11 that the head can be moved backwardly with respect to the shaft 11. In order to accomplish this, a pin 31 is positioned to project from a base 32 downwardly through an axial groove 33 formed in the disc 30.

The pin 31 is attached to one end of a rod 34 and the other end of the rod 34 is inserted in a transverse groove 36 provided in the inner wall of the rotary shaft 11. A hole 37 is provided in the wall of the shaft 11 opposite the groove 36 in order to permit the entrance of the rod 34 through the axial aperture 35 and into the groove 36.

The centralized aperture 35 in the shaft 11 has slidably mounted therein a shaft 38, the shaft 38 being so mounted in the aperture 35 as to engage the lever 29 when the plunger 28 is activated. The end of the shaft 38 opposite the lever 29 is tapered as at 46, and this tapered surface 46 is engaged by the inside edge of the hole 37 provided in the shaft 11.

In operation when the tape 13 has worn sufficiently to produce a change of amplitude as illustrated in FIGURE 3, the plunger of solenoid 28 is activated and the lever 29 engages the shaft 38 and presses the shaft against the force of a return spring 39. When this occurs, the rod 34 moves in the direction of the arrow 40 toward the right, thereby sliding the head 10 against the force of a return spring 41. This moves the head away from the magnetic tape and prevents further wearing of the tape.

Figure 5:
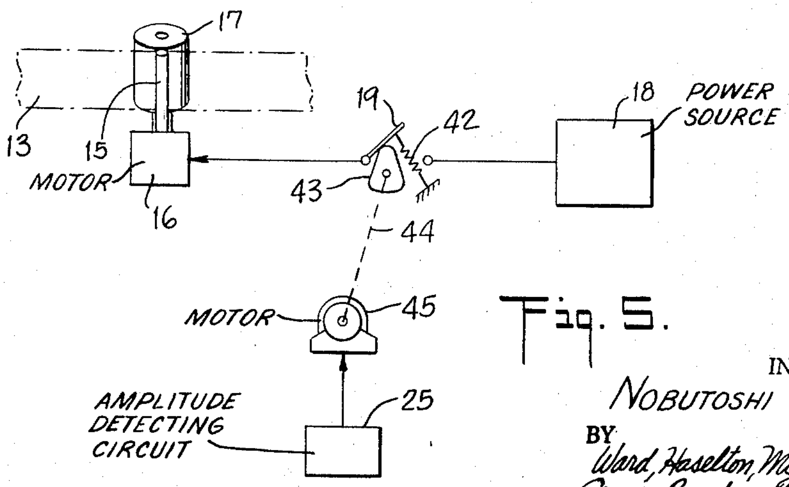
FIGURE 5 is a schematic diagram illustrating a portion of the video tape recorder illustrated in FIGURE 2 and depicting a further embodiment of the invention.

In the apparatus illustrated in FIGURE 5, when the wear tolerance of the tape has been reached, the magnetic tape is shifted slightly, such that it is being scanned in a different position. In order to accomplish this the switch 19 which is interposed between the capstan motor 16 and the power source 18, is maintained normally closed by a spring 42. A cam 43 is mounted in such a position that the switch 19 is moved to an off position against the force of the spring 42 in one rotational position of the cam 43 and in another rotational position of the cam 43 the switch 19 is allowed to move to its normally on or closed position. The cam is rotated by a shaft 44 which is driven by a motor 45. The motor 45 is activated by the detecting circuit 25, the detecting circuit 25, as previously explained, being designed to respond to variations in the output from the head 10, the motor 45 becoming operable when the amplitude of the signal from the head falls below a certain level.

With the structure as illustrated in FIGURE 5, a still picture is produced when the cam 43 is in the position illustrated in FIGURE 5. When a variation in current occurs, such as illustrated in FIGURE 3C, which is sensed by the detecting circuit 25 during the reproduction of a still picture, the motor 45 is driven in response to this variation and rotates the cam 43 by a predetermined amount, thereby allowing the spring 42 to close the switch 19 and turn the switch on. When this occurs the motor 16 is driven for a short period of time in order to rotate the capstan 15 thereby moving the tape 13 over a short distance. When this occurs, the magnetic head 10 scans a track that is extremely close to that of the former still picture and at this point the output of the detecting circuit 25 increases. When this occurs the cam 43 stops rotating and a still picture is obtained of a field extremely close to that of the former field being scanned.

With the apparatus of the present invention, the magnetic tape is prevented from wearing unnecessarily and therefore the tape is not damaged by prolonged scanning with the apparatus of the present invention. Although several embodiments of the invention have been described, it is to be understood that these are merely illustrative of the invention and changes and modifications may be made thereto without departing from the scope of the present invention as defined in the appended claims.

I claim:

1. Apparatus for use with a magnetic tape recording and reproducing device having a rotating head and a tape transport means wherein said apparatus limits continuous scanning of any one portion of said tape during playback to an interval which will not result in wear or abrasion of said tape, said apparatus comprising detecting means connected to said head for detecting changes in said reproduced signal due to wear or abrasion of said tape, and means responsive to said changes in signal for discontinuing scanning of said one portion of said tape.

2. Apparatus for use with a magnetic tape recording and reproducing device having a rotating head and a tape transport means wherein said apparatus limits continuous scanning of any one portion of said tape during playback to an interval which will not result in wear or abrasion of said tape, said apparatus comprising detecting means connected to said head for detecting changes in said reproduced signal due to wear or abrasion of said tape, and relay means responsive to said changes in signal for stopping said head from rotating and thereby discontinuing scanning of said one portion of said tape.

3. Apparatus for use with a magnetic tape recording and reproducing device having a rotating head and a tape transport means wherein said apparatus limits continuous scanning of any one portion of said tape during playback to an interval which will not result in wear or abrasion of said tape, said apparatus comprising detecting means connected to said head for detecting changes in said reproduced signal due to wear or abrasion of said tape, relay means responsive to said changes in signal and said relay means being connected to said head to stop said head from rotating upon occurrence of said signal indicating wear or abrasion of said tape thereby discontinuing scanning of said one portion of said tape.

4. Apparatus for use with a magnetic tape recording and reproducing device having a rotating head and a tape transport means wherein said apparatus limits continuous scanning of any one portion of said tape during playback to an interval which will not result in wear or abrasion of said tape, said apparatus comprising detecting means connected to said head for detecting changes in said reproduced signal due to wear or abrasion of said tape, and relay means responsive to said changes in signal for moving said head away from said tape thereby discontinuing scanning of said one portion of said tape.

5. Apparatus for use with a magnetic tape recording and reproducing device having a rotating head and a tape transport means wherein said apparatus limits continuous scanning of any one portion of said tape during playback to an interval which will not result in wear or abrasion of said tape, said apparatus comprising detecting means connected to said head for detecting changes in said reproduced signal due to wear or abrasion of said tape, and relay means responsive to said changes in signal and connected to said tape transport means for moving said tape thereby discontinuing scanning of said one portion of said tape and scanning at an adjacent portion of said tape.

6. A magnetic tape recording and reproducing device having a rotating head and tape transport means wherein continuous scanning of any one portion of said tape during production of a still picture while reproducing is discontinued by apparatus associated with said device upon wearing or abrasion of said tape, said apparatus comprising detecting means connected to said head for detecting changes in said reproduced signal due to wear or abrasion of said tape, power means connected to said tape transport means for energizing said tape transport to drive said tape past said head, switch means interposed between said tape transport and said power means, said switch means being normally open during production of a still picture, and cams means responsive to said changes in signal for closing said switch upon occurrence of a signal change indicative of wear or abrasion of said tape whereby said tape transport is energized to move said tape whereby scanning is continued at an adjacent portion of said tape.

7. A magnetic tape recording and reproducing device having a rotating head and tape transport means wherein continuous scanning of any one portion of said tape during production of a still picture while reproducing is discontinued by apparatus associated with said device upon wearing or abrasion of said tape, said apparatus comprising detecting means connected to said head for detecting amplitude changes in said reproduced signal due to wear or abrasion of said tape, power means connected to said tape transport means for energizing said tape transport to drive said tape past said head, switch means interposed between said tape transport and said power means, said switch means being normally open during production of a still picture, and cam means for closing said switch, motor means for driving said cam, and said motor being responsive to amplitude changes in said signal for moving said cam to a position where said switch is closed upon occurrence of a signal amplitude change indicative of wear or abrasion of said tape whereby said tape transport is momentarily energized to move said tape whereby scanning is continued at an adjacent portion of said tape.

8. A magnetic tape recording and reproducing device having a rotating head and tape transport means wherein continuous scanning of any one portion of said tape during production of a still picture while reproducing is discontinued by apparatus associated with said device upon wearing or abrasion of said tape, said apparatus comprising detecting means connected to said head for detecting changes in the amplitude of said reproduced signal due to wear or abrasion of said tape, lever means for moving said head out of contact with said tape, and relay means responsive to amplitude changes in said signal for activating said lever to move said head out of contact with said tape upon occurrence of a signal amplitude change indicative of wear or abrasion of said tape.

9. A magnetic tape recording and reproducing device having a rotating head and tape transport means wherein continuous scanning of said tape during production of a still picture while reproducing is discontinued by apparatus associated with said device upon wearing or abrasion of said tape, said apparatus comprising detecting means connected to said head for detecting changes in the amplitude of said reproduced signal due to wear or abrasion of said tape, a disk rotatively mounted on a shaft, said head being movably mounted on said disk and adapted to selectively engage said tape, lever means connected to said head and adapted to move said head out of engagement with said tape, a sleeve slidably mounted in said shaft, said sleeve normally engaging said lever and preventing said lever from moving said head out of engagement with said tape, and relay means responsive to amplitude changes in said signal for moving said sleeve upon occurrence of a signal amplitude change indicative of wear or abrasion of said tape whereby said lever moves said head out of engagement with said tape.

References Cited

UNITED STATES PATENTS 3,255,307 6/1966 Schuller.
3,328,521 6/1967 Moskovitz.

ROBERT L. GRIFFIN, *Primary Examiner.*

H. W. BRITTON, *Assistant Examiner.*